United States Patent [19]
Toda et al.
[11] 3,720,618
[45] March 13, 1973

[54] METHOD OF PRODUCING A POWDER OF COBALT-CONTAINING NEEDLE-LIKE SHAPED GAMMA-FERRIC OXIDE PARTICLES AS MAGNETIC RECORDING MATERIAL

[75] Inventors: Hideo Toda; Shigeki Shimizu; Hisato Ihara, all of Hiroshima, Japan

[73] Assignee: Toda Kogyo Co. Ltd., Hiroshima, Japan

[22] Filed: Feb. 25, 1971

[21] Appl. No.: 118,654

[30] Foreign Application Priority Data

May 8, 1970 Japan ................................45/39077

[52] U.S. Cl. ............................252/62.56, 252/62.55
[51] Int. Cl. ............................................C04b 35/00
[58] Field of Search ...........252/62.56, 62.55; 23/200

[56] References Cited

UNITED STATES PATENTS

| | | | |
|---|---|---|---|
| 3,288,563 | 11/1966 | Klomp et al. | 252/62.56 X |
| 3,075,919 | 1/1963 | Gruber et al. | 252/62.56 X |
| 3,117,933 | 1/1964 | Abeck et al. | 252/62.56 |
| 3,081,264 | 3/1963 | Nobvoka et al. | 252/62.56 |

*Primary Examiner*—Edward J. Meros
*Assistant Examiner*—J. Cooper
*Attorney*—Jacobs & Jacobs

[57] ABSTRACT

Procedure is described for producing a powder of cobalt-containing, needle-like shaped gamma-ferric oxide, $\gamma$-$Fe_2O_3$ particles useful for magnetic recording and the making of magnetic tape, magnetic sheet and magnetic disk with the powder which has high coercive force, high remanence and good dispersibility, uniform chemical composition, the cobalt uniformly dispersed on each particle, no twin particle structure, a particle length of 0.2–0.5 micron, a specific surface area of 15–25 $m^2/g$ and a content of anion such as $SO_4^{2-}$ less than 0.1 percent. Alkali is added to a mixture of a ferrous salt solution and a cobalt salt solution until the pH exceeds 11, an oxidizing gas of constant oxygen partial pressure is blown into the solution as uniformly fine air bubbles, also causing agitation while maintaining the solution at 30°–50°C, whereupon alpha-$Fe_2O_3$ hydrate particles precipitate with the cobalt ions in solid solution, and by washing, dehydrating, reducing and oxidizing conversion into the desired $\gamma$-$Fe_2O_3$ particles results.

5 Claims, 2 Drawing Figures

(X 40,000) 1μ

(X 40,000) 1μ

Figure 1:
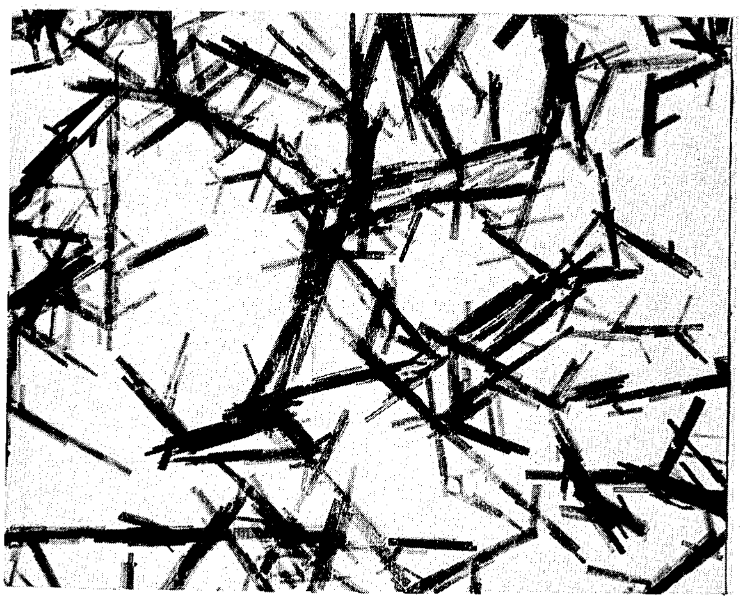

INVENTORS
HIDEO TODA
SHIGEKI SHIMIZU
HISATO IHARA
BY Jacobs + Jacobs
ATTORNEYS

METHOD OF PRODUCING A POWDER OF COBALT-CONTAINING NEEDLE-LIKE SHAPED GAMMA-FERRIC OXIDE PARTICLES AS MAGNETIC RECORDING MATERIAL

This invention relates to a method of producing a powder of cobalt-containing, needle-like shaped gamma-ferric oxide, $\gamma$-$Fe_2O_3$, particles, for magnetic recording purposes and to the production of a magnetic tape, magnetic sheet and magnetic disk provided with such a powder.

The main purpose of this invention is to provide a new method of producing a powder of cobalt-containing, needle-like shaped $\gamma$-$Fe_2O_3$ particles which have excellent qualities as magnetic recording material such as high coercive force (Hc), high remanence (Br) and good dispersibility.

The requirements for a magnetic tape, magnetic sheet and magnetic disk applied for magnetic sound recording, magnetic video recording or memory element in electronic computers are becoming increasingly severe as to density and fidelity. In order to meet these requirements, ferromagnetic powder to be kneaded in magnetic film as magnetic recording material must be made to have increased magnetic properties, especially coercive force (Hc) and remanence (Br).

As known by those skilled in the art, the coercive force of a ferromagnetic substance is determined by its shape anisotropy, crystal magnetic anisotropy, strain anisotropy or exchange anisotropy, or by the interaction among these. It is known that a ferromagnetic substance consisting of minute and single domain particles has an increased coercive force on account of the rotation magnetization mechanism. It is also known that the remanence of a ferromagnetic substance is determined by its magnetic orientation; the larger the axial ratio of the needle-like shaped particles composing it, the better its magnetic orientation and the larger its remanence to magnetization ratio (Br/Bm) and thus the higher its remanence.

The hitherto known ferric oxide of needle-like particle shape derived a high coercive force from its shape anisotropy and a high remanence from its magnetic orientation. It is further known that the addition of cobalt to $\gamma$-$Fe_2O_3$ of needle-like particle shape favorably affects its magnetic properties by the effect of the cobalt ions on its crystal magnetic anisotropy.

Various methods of producing a powder of cobalt-containing, needle-like shaped $\gamma$-$Fe_2O_3$ particles as magnetic recording material are known such as the three methods hereinafter described.

I. A method comprising adding less than the equivalent to $Fe^{2+}$ of caustic soda, NaOH, to 0.1–0.7 mol/l of ferrous salt (e.g. ferrous sulfate salt) aqueous solution, passing an oxidizing gas through the solution for oxidation at a temperature of 0°–60°C to produce a precipitage of $\alpha$-$Fe_2O_3$ hydrate particles 0.2 – 0.7 micron in length, dipping it into an aqueous cobalt salt solution to have the particles adsorb cobalt ions, and dehydrating, reducing and oxidizing it into a powder of cobalt-containing, needle-like shaped $\gamma$-$Fe_2O_3$ particles.

II. A method comprising obtaining $\alpha$-$Fe_2O_3$ hydrate particles by the same method as I, putting them as nucleus particles into the mixture of ferrous salt(e.g. ferrous sulfate salt) solution and cobalt salt solution, adding NaOH to the mixture to adjust its pH value to not more than 7, passing an oxidizing gas through the solution for oxidation at a temperature of 20° to 60°C to precipitate $\alpha$-$Fe_2O_3$ hydrate containing cobalt on the said nucleus particles, drying and, if necessary, pulverizing the precipitate, and subjecting it to dehydration, reduction and oxidation into a powder of cobalt-containing, needle-like shaped $\gamma$-$Fe_2O_3$ particles.

III. A method comprising adding NaOH to the mixture of ferrous salt (e.g. ferrous sulfate salt) solution and a desired amount of cobalt salt solution until the pH has reached a value of 4.5 to 6.5 to produce a precipitate of ferrous hydroxide in the mixture, passing an oxidizing gas through the mixture for oxidation at a temperature of 0° to 30°C to convert the said precipitate therein to extremely fine $\alpha$-$Fe_2O_3$ hydrate particles containing cobalt, adding fresh ferrous salt solution and cobalt salt solution to the reaction solution in which the said precipitated particles exist and passing an oxidizing gas through the resultant solution at a temperature of 30°C to 65°C while adding NaOH to keep the pH of the solution between 4.5 and 6.5 in order to cause growth or enlarge the precipitated particles (to a length of not less than 0.5 micron), and finally converting the grown $\alpha$-$Fe_2O_3$ hydrate particles containing cobalt by dehydration, reduction and oxidation into a powder of cobalt-containing, needle-like shaped $\gamma$-$Fe_2O_3$ particles.

The above three conventional methods all have the following disadvantages or difficulties and can scarcely be said to be satisfactory for producing a powder of cobalt-containing, needle-like shaped $\gamma$-$Fe_2O_3$ particles as magnetic recording material.

Since in any of these methods oxidation is performed in the mother liquid in the acid region and thus the solubility of cobalt ion therein is largely due to the solubility product influence, methods I and II do not give a desired amount of precipitate of cobalt salt and method III gives only a lower content of cobalt in the precipitate formed than that before reaction because cobalt ions do not dissolve in $\alpha$-$Fe_2O_3$ hydrate to form a solid solution. Therefore, by any of methods I, II and III, it is difficult to produce a powder of cobalt-containing, needle-like shaped $\gamma$-$Fe_2O_3$ particles having a uniform chemical composition.

Method I has the further disadvantage that cobalt ions can hardly be uniformly dispersed or adsorbed on the $\alpha$-$Fe_2O_3$ hydrate particles. Methods II and III in which hydroxide is precipitated, grown and oxidized on $\alpha$-$Fe_2O_3$ hydrate particles or cobalt-containing $\alpha$-$Fe_2O_3$ hydrate particles used as nucleus particles have a further disadvantage that it is difficult to cause all of the ferrous hydroxide to precipitate on the nucleus particles and sometimes not the ferrous hydroxide but the liberated nucleus particles are precipitated and sometimes the precipitated and grown ferrous hydroxide particles are of a twin structure.

It is well known that with a powder of cobalt-containing, needle-like shaped $\gamma$-$Fe_2O_3$ particles which has an irregular chemical composition, cobalt ions are not uniformly dispersed on each particle and since the powder contains particles of twin structure, a magnetic tape having good quality cannot be produced.

Besides, in any of these methods the axial ratio of each needle-like shaped particle is as small as 5.5: 1 to 6.5: 1, even after $\alpha$-$Fe_2O_3$ hydrate particles have adsorbed cobalt ions or after they have completed their growth. This offers a still further disadvantage that a proper shape anisotropy for magnetic recording material cannot be obtained.

Since, as described above, in all of these methods oxidation is carried out in an acidic mother liquor, the use of ferrous sulfate salt as starting material for economy reasons would cause jarosite of poor solubility in water to inevitably get mixed in the product. And it would be difficult to reduce the content of $SO_4^{2-}$ in the product to less than 0.5 percent even after it has been thoroughly washed with water.

Also, the methods I, II and III have the following difficulties from the manufacturing technique point of view. All of these methods require two manufacturing processes:
method I involves a process for producing $\alpha$-$Fe_2O_3$ hydrate particles and one for adsorbing cobalt ions and methods II and III involve a process for producing nucleus particles and one for growing them. This complicates operation and proves to be poor economy. Furthermore, all of these methods take as long as about 50 hours at least to go through all the manufacturing steps.

This invention has solved the above-mentioned and other disadvantages or difficulties of the known manufacturing methods. It provides a method of producing in a simple manner and with economy and in a relatively short period of time, a powder of cobalt-containing, needle-like shaped ferric oxide, $\gamma$-$Fe_2O_3$, particles which powder has a uniform chemical composition, has cobalt uniformly dispersed on each particle, contains no particle of twin structure, has a particle length of 0.2 to 0.5 micron and a specific surface area of about 15 to 25 $m^2/g$, and a content of anion, such as $SO_4^{2-}$, less than 0.1 percent.

The said powder produced by this invention permits the manufacture of magnetic memory material, e.g. a magnetic tape having much better qualities than the hitherto commercially available standard magnetic tape (sold under the name of "SCOTCH III") in coercive force, remanence, remanence to magnetization ratio, performance, frequency properties, and signal to noise ratio.

The method of producing the said powder of cobalt-containing, needle-like shaped $\gamma$-$Fe_2O_3$ particles according to the present invention is described below:

To a 0.3–0.7 mol/l of ferrous salt solution, there is added a cobalt salt solution containing 0.5–10 atomic per cent of cobalt ions to $Fe^{2+}$ in the former solution, after which more than the equivalent of alkali is added to the mixture until its pH value has exceeded 11 to produce a ferrous hydroxide precipitate in the mixture. With the solution maintained at 30° to 50°c, an oxidizing gas of a constant oxygen partial pressure in uniformly dispersed fine air bubbles is blown into the solution for oxidation in the solution which is also thereby kept in uniform motion to produce the precipitated particles of $\alpha$-$Fe_2O_3$ hydrate which have a length of 0.2 to 0.5 micron, a length-width ratio of not less than 10:1 and a specific surface area of about 25 to 70 $m^2/g$ and in which cobalt ions dissolve to form a solid solution. By subjecting the said precipitated particles to washing, dehydration, reduction and oxidation, the desired powder of cobalt-containing, needle-like shaped $\alpha$-$Fe_2O_3$ particles is obtained.

The most important feature of the present invention is that alkali such as caustic soda is added to the mixture of ferrous salt solution and cobalt salt solution so that the pH may be 11 or more to produce a precipitate of ferrous hydroxide and oxidation is performed by blowing an oxidizing gas into the solution in which the said precipitate exists, at a temperature of 30° to 50°C. By performing oxidation in the mother liquid having a pH value of not less than 11, it becomes possible to cause all the cobalt ions in the solution to precipitate and dissolve in the $\alpha$-$Fe_2O_3$ hydrate to form a solid solution because of an extremely poor solubility of cobalt ions due to their solubility product. On the contrary, with the conventional methods I, II and III above in which the oxidation is performed in an acidic mother liquor, it was impossible to precipitate all the cobalt ions in the solution.

Also, in this way, cobalt-containing $\alpha$-$Fe_2O_3$ hydrate particles having a length of 0.2 to 0.5 micron required for magnetic recording material can be obtained. According to the observation of the inventors, with the method in which $\alpha$-$Fe_2O_3$ hydrate containing cobalt in solid solution state is obtained by adding less than the equivalent of alkali to the mixture of ferrous salt solution and cobalt salt solution to produce a precipitate of ferrous hydroxide and passing an oxidizing gas such as air through the solution, the pH value of the solution would be less than 7 and the said precipitate changes into a precipitate of cobalt-containing $\alpha$-$Fe_2O_3$ hydrate particles invariably after having passed through a green rust phase. The said $\alpha$-$Fe_2O_3$ particles would be extremely minute and never have a length of 0.2 to 0.5 micron because their crystal nuclei are limited in size.

With methods II and III in which the oxidation is carried out in an acidic mother liquor, cobalt-containing $\alpha$-$Fe_2O_3$ hydrate particles having a length of 0.2 to 0.5 micron could not, therefore, be obtained directly from the ferrous hydroxide precipitate. For this reason, two processes were needed: one for preparing nucleus particles and another for growing them.

On the contrary, if more than the equivalent of alkali is added to the solution, to increase its pH value to 11 or more, the ferrous hydroxide precipitate converts into a precipitate of cobalt-containing $\alpha$-$Fe_2O_3$ hydrate particles without passing through the green rust phase. Therefore, cobalt-containing $\alpha$-$Fe_2O_3$ hydrate particles having a length of 0.2 to 0.5 micron can be obtained directly from the ferrous hydroxide precipitate by properly selecting such reaction conditions as the temperature or the amount of the oxidizing gas introduced, because their crystal nuclei are not limited in size.

Moreover, if the pH of the mother liquor is not less than 11, jarosite having poor solubility in water does not form and the content of $SO_4^{2-}$ in the product can be kept down to below 0.1 percent even if ferrous sulfate salt is used as starting material.

The conditions under which a powder of cobalt-containing, needle-like shaped $\alpha$-$Fe_2O_3$ particles can be produced is described below:

First the pH value of the reaction solution must be not less than 11 for the above-stated reasons, and preferably not less than 12. The reason is that a pH value of not less than 11 gives the particles of the powder desired an axial ration of 10:1 but a pH value of not less than 12 gives a larger axial ratio. For a pH value of more than 7 but less than 11, ferrous oxide of a cubic shape and spinel structure, not of a needle-like shape, would get mixed because of a higher oxidation speed.

The temperature at which oxidation is carried out must be between 30° and 50°C because a higher temperature than 50°C would produce ferrous oxide of a cubic shape and spinel structure, not of a needle-like shape, while a temperature low than 30°C would produce extremely minute particles instead of a desired particle size.

The concentration of $Fe^{2+}$ in the ferrous salt solution must be 0.3 to 0.7 mol/l. The reason is that a higher concentration than 0.7 mol/l would increase the viscosity of the solution and the liability to produce ferrous oxide, not of needle-like shape but rather a cubic shape and spinel structure, while a concentration lower than 0.3 mol/l would reduce the size of the precipitated particles formed to an extremely minute size and furthermore, sometimes cause $\gamma$-$Fe_2O_3$ hydrate precipitated particles to mix in. As the ferrous salt solution, either ferrous sulfate solution or ferrous hydrochloride solution may be used.

The reason for using a cobalt salt solution having a cobalt ion concentration of 0.5–10 atomic per cent is that for a concentration of higher than 10 atomic per cent extremely minute particles would be precipitated and not in a needle-like shape but a cubic shape and spinel structure of ferrous oxide become liable to mix in and for that of less than 0.5 atomic per cent the desired effect of the cobalt ions on the crystal magnetic anisotropy of the particles could not be expected. Ferrous oxide of a cubic shape and spinel structure is not suitable as magnetic recording material because of a smaller coercive force derived from shape anisotropy than that of a needle-like shape.

Next, an oxidizing gas, for example, air of a constant oxygen partial pressure, must be blown into the solution in uniformly dispersed, fine air bubbles in order to improve the motion of the solution and its contact with the ferrous hydroxide precipitate. This is accomplished by passing the oxidizing gas through a filter with a large number of pores. The amount of the oxidizing gas passed should be 0.25 to 2.5 liter/min., preferably 1 to 2.5 liter/min. per liter of the solution. If a mechanical means such as a stirrer is used for stirring the solution, its amount per unit volume of the solution may be reduced. The purpose of passing an oxidizing gas through the solution is not only to oxidize the ferrous hydroxide precipitate in the solution, but to keep the solution in motion instead of remaining at the bottom of the container.

If the reaction is carried out under the above-mentioned conditions, after about 9 to 26 hours, $\alpha$-$Fe_2O_3$ hydrate particles only will be precipitated in the solution, which particles have a length of 0.2 to 0.5 micron, a length-width ratio of 10:1 or more and a specific surface area of about 25 to 70 $m^2/g$ and contain cobalt ions in solid solution state.

Conventional methods may be employed for converting the said $\alpha$-$Fe_2O_3$ hydrate containing cobalt ions by washing, dehydration, reduction and oxidation into the desired powder of cobalt-containing, needle-like shaped $\gamma$-$Fe_2O_3$ particles, but, needless to say, conversion must be performed under such conditions as to retain the shape of the particles unchanged.

Washing must be thoroughly done with water, preferably hot water. The products of the above methods I, II and III would have a pH value of 3 or 4 even after thorough washing while that according to the invention can have a pH value of 6 to 8.

Dehydration is performed in an inert gas atmosphere such as nitrogen gas at a temperature of 200° to 300°C, followed by reduction in a reducing atmosphere such as nitrogen gas at 300° to 400°C and then oxidation at 200° to 350°C. The optimum oxidation temperature should be selected within the said range according to the content of cobalt; the larger the content of cobalt, the higher the oxidation temperature.

A process of dehydrating, reducing and oxidizing the $\alpha$-$Fe_2O_3$ hydrate will now be described in greater detail.

The cobalt-containing $\alpha$-$Fe_2O_3$ hydrate precipitate formed in the reaction solution is filtered off by use of a centrifugal separator and reduced by preliminary drying at about 100° to 150°C into powder form. It is put in an air-tight cylindrical drum into which nitrogen gas is introduced for dehydration at a rate of about 12 liters/min for about 90 minutes, while gradually increasing the temperature from room temperature to about 300°C. The dehydration is followed by reduction in which hydrogen gas in turn is led into it at a rate of about 12 liters/min, after which the cylindrical drum is cooled to room temperature and then air is blown into it for oxidation at a rate of abpit 5 liters/min for about 180 minutes, while increasing the temperature again from room temperature to about 300°C, to obtain a powder of cobalt-containing, needle-like shaped $\gamma$-$Fe_2O_3$ particles.

The product obtained by the said manufacturing process is a powder of cobalt-containing, needle-like shaped $\gamma$-$Fe_2O_3$ particles which powder has a uniform chemical composition, has cobalt dispersed uniformly on each particle, contains no particles of twin structure, consists of particles having a length of 0.2 to 0.5 micron and a specific surface area of about 15 to 25 $m^2/g$ and has a content of anion such as $SO_4^{2-}$, less than 0.1 percent and therefore is ideal as a magnetic recording material.

The said powder according to the present invention has better properties as a magnetic recording material than any conventional powder of this kind because of its particle shape and chemical composition. Its particles, having a larger axial ratio than conventional powder gives it shape anisotropy, in addition to crystal magnetic anisotropy resulting from the presence of cobalt, and thus a very large coercive force which is highly stable to temperature change because of uniform chemical composition and uniform dispersion of cobalt on each particle. The large axial ratio of the particles also improves its magnetic orientation, thus increasing its remanence to magnetization ratio (Br/Bm) and remanence. If the concentration of cobalt ions is, for example, 8 atomic per cent to $Fe^{2+}$ in this invention, a powder having a coercive force of 1.068 oersteds and a remanence of 62.8 emu/g can be obtained.

The magnetic tape, magnetic sheet and magnetic disk provided with the powder of cobalt-containing, needle-like shaped $\gamma$-$Fe_2O_3$ particles produced according to the invention are described below.

The said powder according to the invention is applied or kneaded to the base of magnetic tape, magnetic sheet or magnetic disk for use as magnetic recording material. It may be applied or kneaded in known manner, for example, as illustrated in Example 6.

The magnetic tape, magnetic sheet and magnetic disk using the powder of cobalt-containing, needle-like shaped $\gamma$-$Fe_2O_3$ particles according to this invention have better properties than the hitherto commercially available standard products, and especially their large coercive force makes them suitable for a video tape or disk for electronic computers.

The table below shows the properties of the magnetic tape produced by the method in Example 6 by use of the powder produced in Example 1 by comparison with those of the commercially available standard magnetic tape (sold under the name "SCOTCH III"). From the table it will be understood that the magnetic tape using the powder of cobalt-containing, needle-like shaped $\gamma$-$Fe_2O_3$ particles has excellent quality.

TABLE

| | Invention | Standard Tape (Scotch) | Description |
|---|---|---|---|
| Coating Thickness ($\mu$) | 10.0 | 12.0 | polyester film base (2.5 $\mu$ thick) |
| Magnetic Powder Density (g/cc) | 1.50 | 1.25 | |
| Coercive Force (Öe) | 460 | 260 | Measured using a DC |
| Remanence (gauss) | 950 | 810 | Solenoid type BH |
| Remanence to Magneti zation ratio | 0.85 | 0.75 | Tracer at Hmax 3,000 Öe |
| Performance | | | Measured using a |
| Sensitivity (dB) | +4.5 | 0 | magnetic tape |
| Peak Bias (%) | +8.0 | 0 | tester at 3M Hz. |
| Frequency Properties | | | The values are com parison values, the |
| 333 Hz | +0.5 | 0 | characteristics of |
| 8,000 Hz | +3.5 | 0 | the standard tape |
| 10,000 Hz | +5.0 | 0 | being assumed to be zero. |
| Signal to Noise Ratio (dB) | +3.7 | | |
| 333 Hz | +2.0 | 0 | |
| 8,000 Hz | +7.0 | 0 | |
| 10,000 Hz | +9.0 | 0 | |
| Print-through effect (dB) | 52.5 | 55.2 | Measured using a magnetic tape tester at 1,000c/s |
| Erasing Effect (dB) | 75.3 | 73.1 | after 48 hours |

Figure 2:
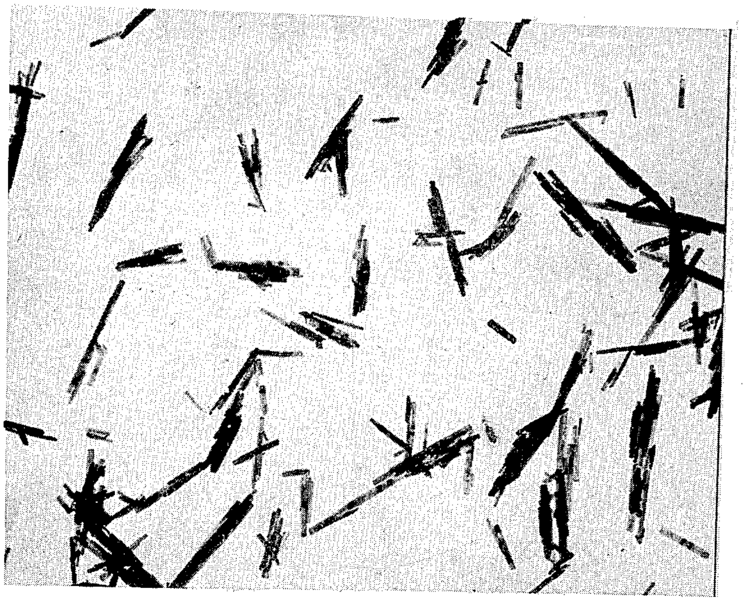

In the accompanying drawing:

FIGS. 1 and 2 show electron microscope photographs (X 40,000) of the precipitate particles.

For purpose of illustration, the present invention is further illustrated by the following examples:

EXAMPLE 1

To a solution of 90 mol (corresponds to 0.5 mol/l of $FeSO_4 \cdot 7H_2O$ and 1.6 mol (corresponds to a cobalt content of 2 atomic per cent to $Fe^{2+}$) of $Fe(Co)SO_4$ in 80 liters of water was added a solution of 422 mol of NaOH in 80 liters of water, after which water was added to make up to 180 liters. The ratio of the amount of NaOH was 2.3 equivalents to the acid radical in the whole solution. A precipitate of ferrous hydroxide formed in the solution and the pH of the solution was 12.3.

With the said solution kept at 40°C, oxidation was effected by blowing air in minute air bubbles through the solution at a rate of 250 liters per minute (1.40 liters per minute per liter of the solution). After oxidation for 16 hours the solution did not turn blue or show the presence of $Fe^{2+}$ ions in a color identification test using 1 percent hydrochloride acid solution containing red prussiate, and precipitated particles of cobalt-containing $\alpha$-$Fe_2O_3$ hydrate assuming bright yellowish-brown color had been formed in the solution.

The said precipitated particles were washed well with water, filtered off by means of a centrifugal separator and dried at about 130°C to obtain a powder of cobalt-containing $\alpha$-$Fe_2O_3$ hydrate. According to electron microscope measurements, it was found that the particles of the obtained powder had a needle-like shape, a length of 0.3 to 0.45 micron, a specific surface area as measured by the B.E.T. method of 37 $m^2/g$, and a length-width ratio of 10:1 or more. As a result of X-ray diffractiometry, it was confirmed that their crystal structure was of the orthorhombic system or the same system as that of $\alpha$-$Fe_2O_3$ hydrate. FIG. 1 shows an electron microscope photograph (x40,000) of the precipitated particles.

The said powder was converted into a powder of cobalt-containing, needle-like shaped, ferrous oxide, $\gamma$-$Fe_2O_3$, particles by dehydration at 300°C in $N_2$ gas atmosphere, reduction at 340°C in $H_2$ gas reducing atmosphere, and finally air oxidation at 200°C. The said powder obtained consisted of a needle-like shape of crystals or particles having a length of 0.3 to 0.4 micron, a width of 0.04 to 0.06 micron, and a specific surface area of about 15 $m^2/g$.

The said powder also had the following properties as a powdery substance: apparent density 0.15 g/cc; tapping density 0.37 g/cc; pH value 7.4; oil absorption 53 cc/100 g; and a content of $SO_4^{2-}$ of less than 0.01 percent. The magnetic properties of the said powder as measured at Hmax 2,000 oersteds using a DC solenoid type BH tracer were as follows: Coercive force 480 oersteds; remanence 46.6 emu/g; saturation magnetization ($Bm/\alpha A$)80.2 emu/g.

As will be apparent from the above-mentioned shape and properties, the powder of cobalt-containing, needle-like shaped $\gamma$-$Fe_2O_3$ particles produced in this example has excellent quality as magnetic recording material and, if applied for e.g. a magnetic tape as illustrated in Example 6, permits the manufacture of a magnetic tape having excellent quality.

EXAMPLE 2

To a solution of 90 mol (corresponds to 0.5 mol/l) of $FeSO_4 \cdot 7H_2O$ and 5.4 mol (corresponds to a cobalt content of 6 atomic per cent to $Fe^{2+}$) of Fe(Co) $SO_4$ in 80 liters of water was added a solution of 438 mol of NaOH in 80 liters of water, after which water was added to make up to 180 liters. The ratio of the amount of NaOH was 2.3 equivalents to the acid radical in the whole solution. A precipitate of ferrous hydroxide was formed in the solution and the pH of the solution was 12.3.

With the said solution kept at 40°C, oxidation was carried out by blowing air in minute air bubbles through the solution at a rate of 300 liters per minute (1.67 liters per minute per liter of the solution). After oxidation for 20 hours the solution did not turn blue or show the presence of $Fe^{2+}$ in a color identification test using 1 percent hydrochloric acid solution containing red prussiate, and precipitated particles of cobalt-containing $\alpha$-$Fe_2O_3$ hydrate assuming yellowish-brown color had been formed in the solution.

The said precipitated particles were washed well with water, filtered off by means of a centrifugal separator, and dried at about 130°C to obtain a powder of cobalt-containing $\alpha$-$Fe_2O_3$ hydrate. According to electron microscope measurements, it was found that the particles of the obtained powder had a needle-like shape, a length of 0.28 to 0.38 micron, a specific surface area as measured by the B.E.T. method of 67 $m^2/g$, and a length-width ratio of 10:1 or more. X-ray diffractiometry showed that their crystal structure was of the orthorhombic system or the same system as that of $\alpha$-$Fe_2O_3$ hydrate. FIG. 2 shows an electron microscope photograph (x40,000) of the precipitated particles.

The said powder was converted into a powder of cobalt-containing, needle-like shaped, ferrous oxide, $\gamma$-$Fe_2O_3$, particles by dehydration at 300°C in $N_2$ gas atmosphere, reduction at 350°C in $H_2$ gas reducing atmosphere, and finally air oxidation at 200°C.

The said powder obtained consisted of a needle-like shape of particles having a length of 0.2 to 0.3 micron, a width of 0.03 to 0.04 micron, and a specific surface area of about 24 $m^2/gr$. The said powder also had the following properties as a powdery substance: apparent density 0.23 g/cc; tapping density 0.54 g/cc; oil absorption 35 cc/100 g; and had a content of $SO_4^{2-}$ of less than 0.01 percent. The magnetic properties of the said powder as measured at Hmax 2,000 oersteds using a DC solenoid type BH tracer were as follows: coercive force 821 oersteds; remanence 56.3 emu/g; saturation magnetization 72.1 emu/g.

The powder of cobalt-containing $\alpha$-$Fe_2O_3$ hydrate particles obtained in this example was tentatively converted into a powder of cobalt-containing, needle-like shaped $\gamma$-$Fe_2O_3$ particles by dehydrating at 300°C in $N_2$ gas atmosphere, reducing at 350°C in $H_2$ gas reducing atmosphere, and finally oxidizing at 300°C with the flow of air. On measurement by the same method as stated above the powder produced showed a coercive force of 966 oersteds, a remancence of 58.6 emu/g and a saturation magnetization of 78.2 emu/g. As a result, it was confirmed that where the cobalt content is large, the increase in the oxidation temperature can improve the magnetic properties of the product.

As will be apparent from the above-mentioned shape and properties, the powder of cobalt-containing, needle-like shaped $\alpha$-$Fe_2O_3$ particles produced in this example has excellent quality as magnetic recording material, and is useful for the production of a magnetic tape, a magnetic sheet and a magnetic disk.

EXAMPLE 3

To a solution of 126 mol (corresponds to 0.7 mol/1) of $FeSO_4 \cdot 7H_2O$ and 2.52 mol (corresponds to a cobalt-content of 2 atomic per cent to $Fe^{2+}$) of $Fe(Co)SO_4$ in liters of water was added a solution of 591 mol of NaOH in 80 liters of water, after which water was added to make up to 180 liters. The ratio of the amount of NaOH was 2.3 equivalents to the acid radical in the whole solution. A precipitate of ferrous hydroxide was formed in the solution and the pH value of the solution was 12.3.

With the said solution kept at 40°C, oxidation was effected by blowing air in minute air bubbles through the solution at a rate of 200 liters per minute (1.11 liters per minute per liter of the solution) and oar type blades in the solution at a speed of 150 revolutions per minute. After oxidation for 16 hours the solution did not turn blue or show the presence of $Fe^{2+}$ in a color identification test using 1 percent hydrochloric acid solution containing red prussiate, and precipitated particles of cobalt-containing $\alpha$-$Fe_2O_3$ hydrate assuming yellowish-brown color had been formed in the solution.

The said precipitated particles were washed well with water, filtered off by means of a centrifugal separator, and dried at about 130°C to obtain a powder of cobalt-containing $\alpha$-$Fe_2O_3$ hydrate. According to electron microscope measurements, it was found that the particles of the obtained powder had a needle-like shape, a length of 0.3 to 0.45 micron, a specific surface area as measured by the B.E.T. method of 33 $m^2/g$, and a length-width ratio of 10:1 or more. X-ray diffractiometry showed that their crystal structure was of the orthorhombic system or the same system as that of $\alpha$-$Fe_2O_3$ hydrate.

The said powder was converted into a powder of cobalt-containing, needle-like shaped, ferrous oxide, $\gamma$-$Fe_2O_3$, particles by dehydration at 300°C in $N_2$ gas atmosphere, reduction at 360°C in $H_2$ gas reducing atmosphere, and finally air oxidation at 200°C.

The said powder obtained consisted of a needle-like shape of particles having a length of 0.3 to 0.4 micron, a width of 0.04 to 0.06 micron, and a specific surface area of about 15 $m^2/g$. The said powder showed the following magnetic properties as measured at HMAX 2,000 oersteds using a DC solenoid type BH tracer: coercive force 441 oersteds; remanence 45.2 emu/g; saturation magnetization 81.1 emu/g. The properties of the said powder as a powdery substance proved to be almost the same as those of the powder produced in Example 1.

EXAMPLE 4

To the mixture of 75 liters of 0.7 mol/1 of $FeCl_26H_2O$ and 1 kg (corresponds to a cobalt content of 8 atomic per cent to $Fe^{2+}$) of $Co\ Cl \cdot 6H_2O$ in 20 liters of water was added a solution of 680 mol of NaOH in 80 liters of water, after which water was added to make up to 180 liters. The ratio of the amount of NaOH was 6 equivalents to the acid radical in the whole solution. A precipitate of ferrous hydroxide formed in the solution and the pH value of the solution was 13.2.

With the solution maintained at 30°C, oxidation was carried out by blowing air in minute air bubbles through the solution at a rate of 200 liters per minute (1.11 liters per minuted per liter of the solution) and operating a stirrer provided with turbine type blades or oar type blades in the solution at a speed of 150 revolutions per minute. After oxidation for 9 hours the solution did not turn blue or show the presence of $Fe^{2+}$ in a color identification test using 1 percent hydrochloric acid solution containing red prussiate, and precipitated particles of cobalt-containing $\alpha$-$Fe_2O_3$ hydrate assuming yellowish-brown color had been formed in the solution.

The said precipitated particles were washed well with water, filtered off by means of a centrifugal separator, and dried at about 120°C to obtain a powder of cobalt-containing $\alpha$-$Fe_2O_3$ hydrate. According to electron microscope measurements, it was found that the particles of the obtained powder had a needle-like shape, a length of 0.26 to 0.49 micron, a specific surface area as measured by the B.E.T. method of 58 $m^2/g$, and a length-width ratio of about 14:1. X-ray diffractiometry showed that their crystal structure was of the orthorhombic system or the same system as that of $\alpha$-$Fe_2O_3$ hydrate.

The said powder was converted into a powder of cobalt-containing, needle-like shaped ferrous oxide, $\alpha$-$Fe_2O_3$, particles by dehydration at 300°C in $N_2$ gas atmosphere, reduction at 350°C in $H_2$ gas reducing atmosphere, and finally air oxidation at 300°C. The powder obtained consisted of a needle-like shape of particles having a length of 0.24 to 0.4 micron, a width of 0.03 to 0.05 micron and a specific surface area of about 20 $m^2/g$.

The magnetic properties of the said powder as measured at Hmax 2,000 oersteds using a DC solenoid type BH tracer were as follows: coercive force 1,068 oersteds; remanence 62.8 emu/g; saturation magnetization 73.4 emu/g. The properties of the said powder as a powdery substance proved to be almost the same as those of the powder produced in Example 2, and its content of $Cl^{1-}$ was less than 0.01 percent.

As will be apparent from the above-mentioned shape and properties, the powder of cobalt-containing, needle-like shaped $\gamma$-$Fe_2O_3$ particles produced in this Example has excellent quality as magnetic recording material and therefore is useful to produce a magnetic tape, a magnetic sheet and a magnetic disk.

EXAMPLE 5

To a solution of 90 mol (corresponds to 0.5 mol/1) of $FeSO_4 \cdot 7H_2O$ and 9 mol (corresponds to a cobalt content of 10 atomic per cent to $Fe^{2+}$) of $CoSO_4 \cdot 7H_2O$ in 80 liters of water was added a solution of 588 mol of NaOH in 80 liters of water, after which water was added to make up to 180 liters. The ratio of the amount of NaOH was 3 equivalents to the acid radical in the whole solution. A precipitate of ferrous hydroxide formed in the solution and the pH value of the solution was 12.6.

With the said solution maintained at 30°C, oxidation was carried out by blowing air in minute air bubbles through the solution at a rate of 300 liters per minute (1.67 liters per minute per liter of the solution) and operating a stirrer provided with turbine type blades and oar type blades in the solution at a speed of 150 revolutions per minute. After oxidation for 18 hours, the solution did not turn blue or show the presence of $Fe^{2+}$ in a color identification test using 1 percent hydrochloric acid solution containing red prussiate, and precipitated particles of cobalt-containing $\alpha$-$Fe_2O_3$ hydrate assuming yellowish-brown color had been formed in the solution.

The said precipitated particles were washed well with water, filtered off by means of a centrifugal separator and dried at about 130°C to obtain a powder of cobalt-containing $\alpha$-$Fe_2O_3$ hydrate. According to electron microscope measurements, it was found that the particles of the obtained powder had a needle-like shape, a length of 0.3 to 0.4 micron, a specific surface area as measured by the B.E.T. method of 52 $m^2/g$, and a length-width ratio of 10:1 or more. X-ray diffractiometry showed that their crystal structure was of the orthorhombic system.

The said powder was converted into a powder of cobalt-containing, needle-like shaped ferrous oxide, $\gamma$-$Fe_2O_3$, particles by dehydrating at 300°C in $N_2$ gas atmosphere, reducing at 350°C in $H_2$ gas reducing atmosphere, and finally oxidizing at 350°C with air. The said powder obtained consisted of a needle-like shape of particles having a length of 0.27 to 0.36 micron, a width of 0.03 to 0.04 micron and a specific surface area of about 23 $m^2/g$.

The magnetic properties of the said powder as measured at Hmax 2,000 oersteds using a DC solenoid type BH tracer were as follows: coercive force 1,241 oersteds; remanence 58 emu/g; saturation magnetization 69 emu/g.

As will be apparent from the above-mentioned shape and properties, the powder of cobalt-containing, needle-like shaped $\gamma$-$Fe_2O_3$ particles produced in this Example has excellent quality, and therefore is used to produce magnetic tape, magnetic sheet and magnetic disk.

EXAMPLE 6

A magnetic tape using the powder of cobalt-containing, needle-like shaped $\gamma$-$Fe_2O_3$ particles produced according to the present invention (the powder obtained in Example 1 was used for this example) was produced as follows:

| | |
|---|---|
| powder of cobalt-containing, needle-like shaped $\gamma$-$Fe_2O_3$ particles produced in Example 1 | 1,000 g |
| Powder polymerized from vinyl chloride and vinyl acetate | 250 g |
| Methyl ethyl ketone, $CH_3COC_2H_5$ | 880 g |
| Dioxyl phthalate $C_{24}H_{38}O_4$(plasticizer) | 50 g |

The above materials were mixed well into a paste, which was kneaded about 5 times by means of a three-rolled roll mill. To the paste were added 2.5 g of aluminum stearate, $Al(C_{17}H_{35}COO)_3$, (stabilizer), 2.5 g of silicone resin (lubricating oil), and 450 g of cyclohexane (solvent),$C_6H_{12}$, after which the mixture was kneaded by means of a ball mill for about 40 hours. The mixture was then diluted with toluene, $C_6H_5CH_3$, to reduce its viscosity to 1,500 $C_p$ and spread on polyester film 25 micron thick to a thickness of 25 micron by means of a doctor blade. Before the coating has dried up, the tape was passed though a DC magnetic field of 920 oersteds for magnetic orientation, i.e., to orient the cobalt-containing, needle-like shaped $\gamma$-$Fe_2O_3$ particles in the coating toward the same direction, after which the tape was subjected to infrared desiccation. A magnetic tape with magnetic coating 10 micron thick was thus produced. The magnetic properties and characteristics of the magnetic tape produced are as shown in the preceding table.

What is claimed is:

1. In the method of preparing cobalt-containing magnetic $\gamma$-ferric oxide in which cobalt-containing $\alpha$-ferric oxide is precipitated as the hydrate through the passage of air through an aqueous solution of a ferrous salt and a cobalt salt, the cobalt-containing $\alpha$-ferric oxide is dehydrated and reduced, and the reduced product is then reoxidized, the improvements resulting in the precipitation of α-ferric oxide hydrate particles containing cobalt in solid solution form, said particles having length of 0.2 to 0.5 microns, a length width ratio of at least 10:1 and a specific surface area of 25 to 70 $m^2/g.$, which in turn upon said dehydration, reduction and reoxidation will produce uniform cobalt-containing γ-ferric oxide needles of a length of from 0.2 to 0.5 microns, a specific surface area of 15 to 25 $m^2/g.$ and a sulfate ion content of less than 1 percent, which comprise (a) adding to an aqueous solution of from 0.3 to 0.7 mol/L of ferrous salt containing sufficient cobalt salt to supply 0.5 to 10 atomic percent of cobalt ion to ferrous ion, an excess of caustic alkali sufficient to produce a pH of not less than 11, (b) maintaining said solution at a temperature of 30° to 50°C, and (c) introducing said air as uniformly dispersed fine bubbles at a constant pressure at a rate of 0.25 to 2.5 L/min/L of solution.

2. The method as defined in claim 1 in which mechanical stirring means are employed for stirring the aqueous solution.

3. The method as defined in claim 1 in which the pH of the aqueous solution is not less than 12.

4. In the method of preparing cobalt-containing magnetic γ-ferric oxide in which cobalt-containing α-ferric oxide is precipitated as the hydrate through the passage of air through an aqueous solution of a ferrous salt and a cobalt salt, the cobalt-containing α-ferric oxide is dehydrated and reduced, and the reduced product is then reoxidized, the improvements resulting in the precipitation of α-ferric oxide hydrate particles containing cobalt in solid solution form, said particles having length of 0.26 to 0.49 microns, a length width ratio of at least 10:1 and a specific surface area of 37 to 67 $m^2/g.$, which in turn upon said dehydration, reduction and reoxidation will produce uniform cobalt-containing γ-ferric oxide needles of a length of from 0.2 to 0.4 microns, a specific surface area of 15 to 24 $m^2/g.$ and a sulfate ion content of less than 0.1 percent, which comprise (a) adding to an aqueous solution of about 0.5 mol/L of ferrous salt containing sufficient cobalt salt to supply about 2 atomic percent of cobalt ion to ferrous ion, more than 1.5 equivalents of caustic alkali so as to produce a pH of not less than 12, (b) maintaining said solution at a temperature of about 40°C, and (c) introducing said air as uniformly dispersed fine bubbles at a constant pressure at a rate of 1 to 2.5 L/min/L of solution.

5. In the method of preparing cobalt-containing magnetic γ-ferric oxide in which cobalt-containing α-ferric oxide is precipitated as the hydrate through the passage of air through an aqueous solution of a ferrous salt and a cobalt salt, the cobalt-containing α-ferric oxide is dehydrate at 200° to 300°C and reduced in a gaseous hydrogen atmosphere at 300° to 400° C and the reduced product is then reoxidized in an air atmosphere at 200° to 350°C, the improvements resulting in the precipitation of α-ferric oxide hydrate particles containing cobalt in solid solution form, said particles having length of 0.3 to 0.45 microns, a length width ratio of at least 10:1 and a specific surface area of about 33 $m^2/g.$, which in turn upon dehydration, reduction and reoxidation will produce uniform cobalt-containing γ-ferric oxide needles of a length of from 0.3 to 0.4 microns, a specific surface area of about 15 $m^2/g.$ and a sulfate ion content of less than 0.1 percent, which comprise (a) adding to an aqueous solution of 0.7 mol/L of ferrous salt containing sufficient cobalt salt to supply 2 atomic percent of cobalt ion to ferrous ion, more than 1.5 equivalents of caustic alkali so as to produce a pH of not less than 2, (b) maintaining said solution at a temperature of 40°C, and (c) introducing said air of a constant oxygen partial pressure as uniformly dispersed fine bubbles at a rate of 0.25 to 2.5 L/min/L of solution while stirring said solution.

* * * * *